United States Patent
Gysin et al.

(10) Patent No.: US 9,817,909 B1
(45) Date of Patent: *Nov. 14, 2017

(54) ACCESSING INFORMATION FROM A FIRMWARE USING TWO-DIMENSIONAL BARCODES

(71) Applicant: American Megatrends, Inc., Norcross, GA (US)

(72) Inventors: William Gysin, Jefferson, GA (US); Kai Yau, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/062,745

(22) Filed: Mar. 7, 2016

Related U.S. Application Data

(63) Continuation of application No. 14/186,981, filed on Feb. 21, 2014, now Pat. No. 9,292,611.

(51) Int. Cl.
  *G06K 7/10* (2006.01)
  *G06F 17/30* (2006.01)
  *G06K 19/06* (2006.01)

(52) U.S. Cl.
  CPC . *G06F 17/30879* (2013.01); *G06K 19/06037* (2013.01)

(58) Field of Classification Search
  USPC ............ 235/375, 462.01, 462.09, 462.1, 383
  See application file for complete search history.

(56) References Cited

U.S. PATENT DOCUMENTS

| | | | |
|---|---|---|---|
| 6,776,342 B1 | 8/2004 | Thuries et al. | |
| 6,902,114 B2 | 6/2005 | Hashimoto et al. | |
| 8,752,758 B1 | 6/2014 | Klebe | |
| 2002/0185540 A1 | 12/2002 | Hashimoto et al. | |
| 2007/0152058 A1 | 7/2007 | Yeakley et al. | |
| 2007/0278303 A1 | 12/2007 | Cattrone | |
| 2009/0228694 A1 | 9/2009 | Karstens | |
| 2010/0094759 A1 | 4/2010 | Kanno et al. | |
| 2010/0163613 A1* | 7/2010 | Bucher | G06F 21/43 235/375 |
| 2010/0268979 A1 | 10/2010 | Johnson | |
| 2011/0035338 A1 | 2/2011 | Kagan et al. | |

(Continued)

OTHER PUBLICATIONS

Office action for U.S. Appl. No. 14/186,981, dated Jan. 30, 2015, Gysin et al., "Accessing Information From a Firmware Using Two-Dimensional Barcodes", 12 pages.

(Continued)

*Primary Examiner* — Tuyen K Vo
(74) *Attorney, Agent, or Firm* — Newport IP, LLC; Leonard J. Hope

(57) ABSTRACT

A firmware setup utility executing on a computing system is configured to display a two-dimensional barcode, such as a Quick Response ("QR") code. The two-dimensional barcode may be encoded with data about the computing system and/or a hyperlink specifying a location from which additional information may be retrieved. Another device, such as a mobile device, may be utilized to scan the two-dimensional barcode, decode the information contained therein, and present the data. If a hyperlink is encoded in the two-dimensional barcode, the device may retrieve the additional information from the specified location and present the retrieved data.

20 Claims, 7 Drawing Sheets

(56) References Cited

U.S. PATENT DOCUMENTS

| | | |
|---|---|---|
| 2011/0095081 A1 | 4/2011 | Zsigmond et al. |
| 2013/0247137 A1* | 9/2013 | Puri ..................... H04L 63/20 |
| | | 726/1 |
| 2014/0042232 A1 | 2/2014 | Farn et al. |
| 2014/0303754 A1 | 10/2014 | Nixon et al. |
| 2015/0288670 A1* | 10/2015 | Bhooshan ............ H04W 12/06 |
| | | 726/7 |

OTHER PUBLICATIONS

Office Action for U.S. Appl. No. 14/186,981, dated Jun. 25, 2015, William Gysin, "Accessing Information From a Firmware Using Two-Dimensional Barcodes", 12 pages.

Office Action for U.S. Appl. No. 14/186,981, dated Sep. 19, 2014, William Gysin, "Accessing Information From a Firmware Using Two-Dimensional Barcodes", 8 pages.

* cited by examiner

ACCESSING INFORMATION FROM A FIRMWARE USING TWO-DIMENSIONAL BARCODES

CROSS REFERENCE TO RELATED APPLICATIONS

This is a continuation of co-pending U.S. patent application Ser. No. 14/186,981 filed Feb. 21, 2014, entitled "Accessing Information from a Firmware Using Two-Dimensional Barcodes", which is incorporated herein by reference in its entirety.

BACKGROUND

Most computing systems utilize a firmware to control their low-level operation. A firmware setup utility is commonly utilized to access and change the operating parameters of a computing system. Such a firmware setup utility may display help information and potentially other types of data in conjunction with various user interface items. For example, a firmware setup utility might provide help information for each type of change that might be made to the operating parameters of a computing system. This information is, however, typically limited due to the size limitations of computer system firmware and on-screen display space. Additionally, this information is typically fixed at the time the firmware is created and, therefore, updated information relevant to various firmware options may be unavailable to a user.

It is with respect to these and other considerations that the disclosure presented herein has been made.

SUMMARY

Technologies are provided herein for accessing additional information in firmware using two-dimensional barcodes, such as Quick Response ("QR") codes. In particular, through an implementation of the concepts and technologies presented herein, a computer system firmware may present a user with helpful information, messages, and technical information related to a computer system that can be viewed on another device, such as a mobile telephone. In this way, additional information can be provided to a user than can typically be included in and presented by a firmware. Additionally, a user can easily obtain information that has been updated after the time that the firmware is created.

According to embodiments described herein, a computing system includes a firmware setup utility program. The firmware setup utility program is configured to allow users to change operating parameters and make other types of configuration changes to the computing system. In order to access this functionality, the computing system may present various menu items for modifying different parameters. In order to permit a user to access additional information regarding each menu item, the firmware setup utility program may display a two-dimensional barcode, such as a QR code, in response to the selection of a menu item. The QR code may encode the location where additional information regarding the menu item may be obtained. For example, and without limitation, the QR code may encode the address of a Web site or other type of information site containing additional information about the selected menu item.

The two-dimensional barcode displayed by the computing system may be scanned from another device, such as a mobile device, and utilized to access the location encoded in the two-dimensional barcode. The device may then retrieve and present information located at the Web server or other type of information site for consumption by the user. For example, information regarding a selected menu item in the firmware setup utility program might be displayed. The location information encoded in the two-dimensional barcode may be modified based upon a privilege level of a user of the computing system. In this way, for example, users having different privilege levels may be presented with different information in response to scanning the two-dimensional barcode and accessing the network location encoded therein.

It should be appreciated that the above-described subject matter may also be implemented as a computing system, a computer-controlled apparatus, a computer process, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for accessing information from a computer system firmware using two-dimensional barcodes. In the following detailed description, references are made to the accompanying drawings that form a part hereof, and which are shown by way of exemplary embodiments and implementations. Note that although the subject matter presented herein has been described in conjunction with one or more particular embodiments and implementations, it is to be understood that the embodiments are not necessarily limited to the specific structure, configuration, or functionality described herein. Rather, the specific structure, configuration, and functionality described herein are disclosed as examples. Various modifications and changes may be made to the subject matter described herein without following the exemplary embodiments and applications illustrated and described, and without departing from the true spirit and scope of the embodiments disclosed herein.

Figure 1:
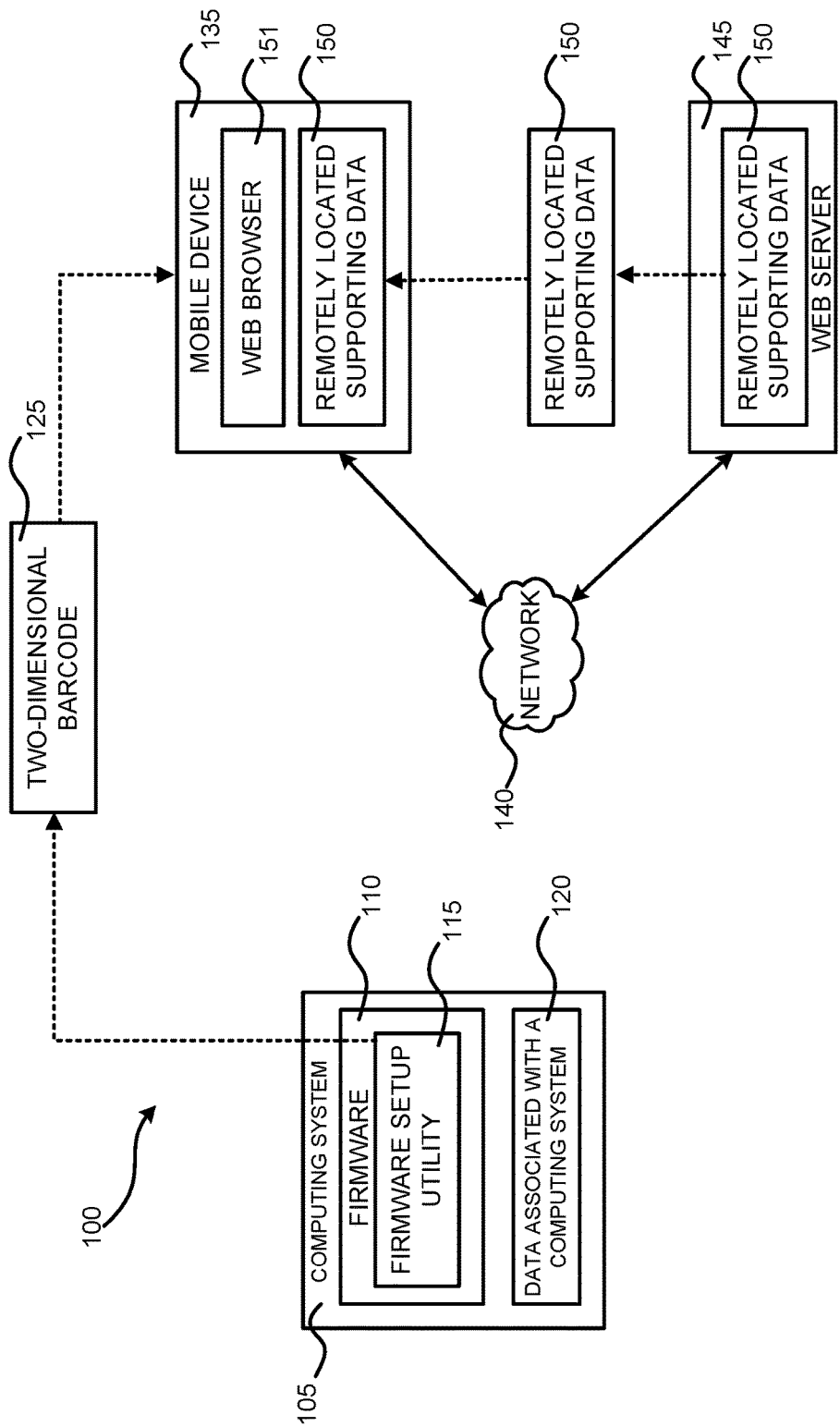
FIG. 1 is a system diagram showing aspects of one mechanism disclosed herein for accessing information from a firmware utilizing two-dimensional bar codes.

Referring now to FIG. 1, a system diagram showing a system 100 that embodies the concepts and technologies disclosed herein will be described. The system 100 shown in FIG. 1 includes a computing system 105. The computing system 105 may be a server computer, a personal computer ("PC") such as a desktop workstation, a laptop, or a notebook, a personal digital assistant ("PDA"), a wireless telephone, a set-top box, a gaming console, or any other type of computing system.

As shown in FIG. 1, the computing system 105 may execute a firmware 110. As discussed briefly above, the firmware 110 may be utilized to control the low-level operation of the computing system 105 and to perform various other functions. For instance, and without limitation, the firmware 110 may comprise a basic input/output system ("BIOS") firmware, an extensible firmware interface ("EFI") compatible firmware, or another type of firmware.

According to various implementations, the firmware 110 may provide a firmware setup utility 115. The firmware setup utility 115 may allow a user to view information about the status and configuration of the computing system 105. For example, and without limitation, the firmware setup utility 115 may gather and provide an interface for displaying various types of data 120 associated with the computing system 105.

The data 120 may include information about the firmware 110, such as a version and build information, manufacturer, and/or other features of the firmware 110. The data 120 might also include data indicative of the health of the computing system 105, such as central processing unit ("CPU") temperature, fan speed, error messages related to test failures, such as from a failure during a power on self-test ("POST"), and/or voltage levels. Although each of the previous examples of data 120 associated with the computing system 105 may be displayed by the firmware setup utility 115, it should be understood that this data 120 might also include information that is not displayed or accessed by the firmware setup utility 115. Additionally, it should be appreciated that these examples are merely illustrative and that the firmware setup utility 115 might also present other types of data 120.

The firmware setup utility 115 might also provide functionality for allowing a user to modify configuration settings of the computing system 105. In order to provide this functionality, the firmware setup utility 115 might provide a user interface ("UI") having selectable items (e.g. menu items) through which a user can select configuration parameters to be modified. An illustrative UI for a firmware setup utility 115 will be illustrated in FIG. 5. The selectable items may be selected when the firmware setup utility 115 detects user input over a selectable item. For example, a user might utilize a keyboard, mouse, or other type of user input device to select an item.

In various embodiments, the firmware setup utility is further configured to present additional information about a selected item. For example, and without limitation, a selectable item may be a menu heading that bears the name of a configurable setting. The UI provided by the firmware setup utility might allow for this setting to be enabled or disabled. If the item is selected, the interface may display more specific information about the purpose of the setting, for example. As a specific example, a mouse-over event on a specific item might cause information about that item to be displayed. However, and as discussed above, the available space for displaying information about the item may be greatly limited in a firmware environment. In order to address this limitation, and potentially others, the firmware setup utility 115 disclosed herein employs a two-dimensional barcode 125 to facilitate the display of more information than could be shown through the firmware setup utility 115 interface.

In order to provide the functionality described above, an item presented by the firmware setup utility 115 may be associated with a two-dimensional barcode 125 that encodes data 120 and/or the network location of remotely located supporting data 150 about the item. In the example shown in FIG. 1, for instance, the two-dimensional barcode 125 has been encoded with the location of data 150 on a Web server 145 accessible to a mobile device 135 via a network 140. The two-dimensional barcode 125 may be a QR code, an AZTEC code, a DATA MATRIX code, or any other type of two-dimensional barcode 125.

The two-dimensional barcode 125 can be displayed on a display device connected to the computing system 125. The displayed two-dimensional barcode 125 can then be read by another device, such as the mobile device 135, that is configured with an integrated camera and appropriate optical recognition ("OCR") software. In the example shown in FIG. 1, the mobile device 135 may decode the two-dimensional barcode 125 to obtain data 120 and/or the location of the additional data 150. The encoded data 120 might be displayed (an illustrative mobile device UI will be illustrated in FIG. 6). Additionally, the location of the additional data 150 may be utilized to retrieve the data 150 and present the retrieved data 150. In this way, additional information regarding each item presented by the firmware setup utility 115 can be obtained by scanning the associated two-dimensional barcode 125, decoding the two-dimensional barcode 125 to obtain encoded information such as the location of additional data 150, retrieving the data 150, and displaying the retrieve data 150. A suitable application might be utilized on the mobile device 135 to decode the two-dimensional barcode 125. Additionally, a Web browser application 151 or other suitable application on the mobile device 135 might be utilized to retrieve the data 150 from the Web server 145 and display the data 150.

In some embodiments, the firmware 110 contains executable code, accessible by the firmware setup utility 115, that produces a two-dimensional barcode 125, such as a QR code, and stores the resulting visual representation in a memory buffer accessible by the firmware setup utility 115. The firmware setup utility 115 may present the QR code, or other two-dimensional barcode 125, by reading from the memory buffer and outputting the visual representation to a connected display.

As discussed briefly above, the firmware setup utility 115 may employ a two-dimensional barcode 125 to encode a uniform resource locator ("URL"). The URL may define the location of remotely stored data 150 stored on a Web server 145 or other type of server computer. In some embodiments, the mobile device 135 may be connected to a network 140, such as the Internet. As mentioned above, the mobile device 135 may decode the location encoded in the two-dimensional barcode 125, connect to the Web server 145 through the network 140, and retrieve and display the remotely located supporting data 150 pointed to by the encoded URL.

In some embodiments, the location encoded in the two-dimensional barcode 125 might be selected based upon the privilege level of the user currently using the computing system 105. For example, and without limitation, various users of the computing system 105 might be assigned various privilege levels. When a user with a user privilege level is utilizing the computing system 105, the firmware setup utility 115 might encode the location of help information, such as but not limited to, user guides, live technical support, or user forums in two-dimensional barcodes 125 presented to the user.

When a user with higher-level privileges, such as administrative privileges, is utilizing the computing system 105, the displayed two-dimensional barcodes 125 might encode the location of technical information. For example, a user having administrative privileges (e.g., an information technology professional) may be fluent in the navigation of the UI and the options presented by the firmware setup utility 115, but may be in need of more extensive technical information explaining the interaction of the options presented with the overall operation of the computing system 105. For a user with administrative privileges, the firmware 110 may encode URLs in the presented two-dimensional barcodes 125 of data 150 that points to technical specifications, schematics for the platform, wikis, and other technical data useful to an information technology professional.

In some embodiments, the data 150 includes information from the original equipment manufacturer ("OEM") of a component (e.g. the motherboard) of the computing system 105. The information may be tips concerning the use of hardware manufactured by the OEM, advertisements, coupon offers, links to an OEM social media site and/or other messages created by the OEM. It should be understood that the data 150 might comprise other types of data and that the examples given herein should not be construed as limiting.

Various types of data 120 associated with the computing system 105 might also be encoded in the URL contained in the two-dimensional barcode 125 in order to provide specific information about the hardware of the computing system 105 and/or the operational state of the computing system 105. For example, and without limitation, a unique identifier for the particular motherboard or other hardware device in the computing system 105 might be encoded in the two-dimensional barcode 125 so that data 150 for that particular motherboard and/or other hardware device can be presented to the user. Other types of data might also be encoded in the two-dimensional barcode 125 and utilized to provide specific information to the user of the computing system 105.

In some embodiments, the firmware setup utility 115 also applies a color scheme to the two-dimensional bar code 125. The color scheme may be used as a visual indicator of the status of certain data indicative of system health. For example, a selectable item may be related to the CPU temperature for the computing system 105. Upon detecting user input selecting the selectable item, the firmware setup utility 115 may display a temperature value and an associated two-dimensional barcode 125 encoding the location of additional data 150 associated with the computing system 105. In this example, the firmware setup utility 115 may apply a color—green, for example—to the two-dimensional barcode 125 for a given range of temperatures considered to be normal. Temperatures higher than a certain value may indicate a system health problem, and the color red may be applied to the two-dimensional barcode 125 to indicate a potential problem. According to various implementations, any number of colors may be assigned to any number of discrete values or ranges of continuous values. The coloration of the two-dimensional barcode 125 does not affect the ability of the mobile device 135 to scan the two-dimensional barcode 125.

Various actions have been described above as being performed by the firmware setup utility 115. It should be understood, however, that in some embodiments, the executable code containing instructions for performing the various functions described herein might be accessible by the firmware 110 outside of the context of the firmware setup utility 115. For example, and without limitation, the firmware 110 may detect an error during POST, a routine that may run during system power up in some embodiments. In response to detecting the error, the firmware 110 may not allow the computing system 105 to continue the boot process, or to enter the firmware setup utility 115. In order to allow the user to obtain additional information regarding the error, the firmware 110 may present a failure error message and a two-dimensional bar code 125 encoded with the location of additional information for the error message. Additional, related data indicative of system health, such as CPU temperature, fan speed and voltage level, may also be encoded in the two-dimensional bar code 125 in order to access specific information about the error. In some embodiments, the firmware 110 also applies a color scheme to the two-dimensional barcode 125 as a visual indicator in the manner described above. In one embodiment, the firmware 110 increases the size of the two-dimensional barcode 125 beyond the size typically displayed in the firmware setup utility 115 to draw the attention of a user of the computing system 105 to the error.

Figure 2:
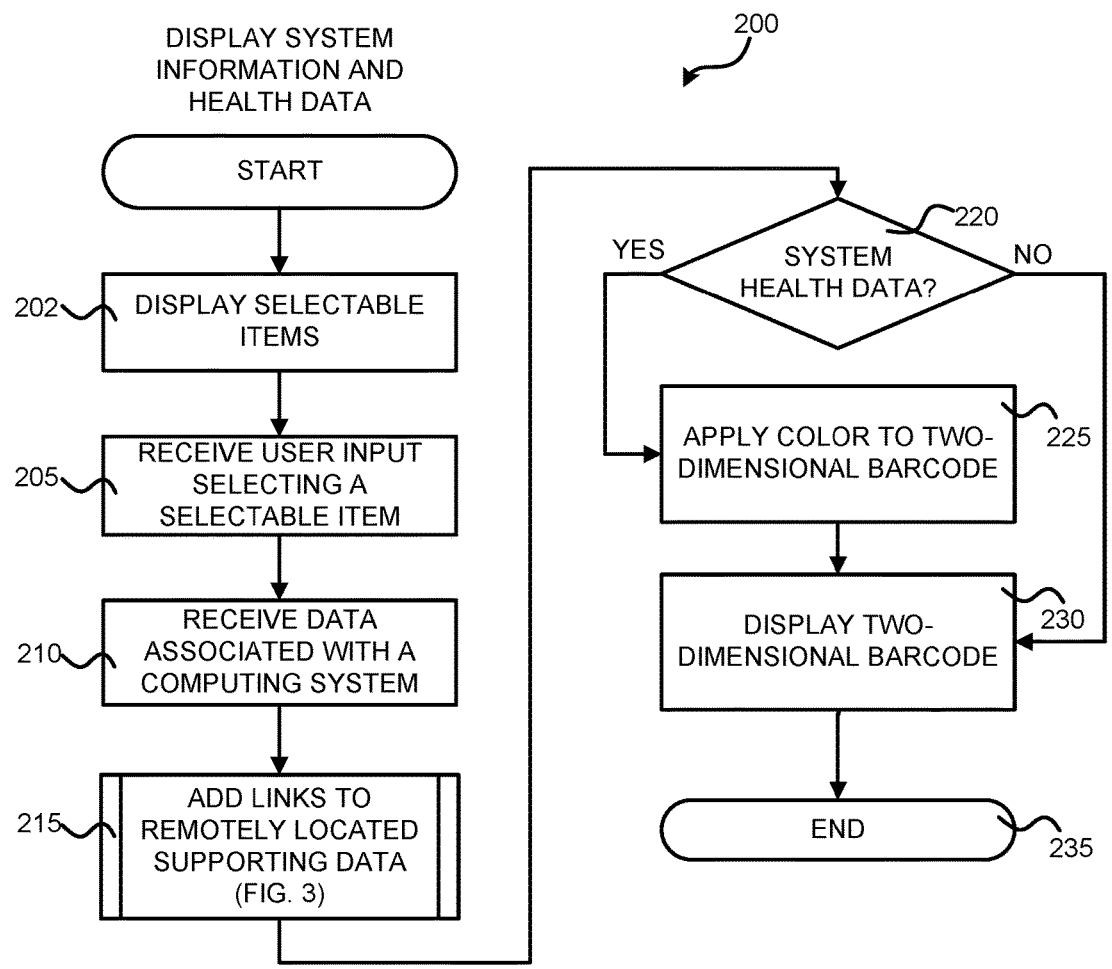
FIG. 2 is a flow diagram showing one illustrative routine for generating data associated with a computing system and remotely located supporting data.

Referring now to FIG. 2, a routine 200 for generating data 120 associated with the computing system 105 and remotely located supporting data 150 will be described. The routine 200 begins at operation 202, where the firmware setup utility 115 displays a UI including one or more selectable items in the manner described above. As mentioned above, the selectable items may be utilized by a user to navigate among the variety of data 120 associated with the computing system 105 that may be presented by the firmware setup utility 115. In this regard, it should be appreciated that the embodiments disclosed herein are not limited to presenting two-dimensional barcodes 125 in conjunction with selectable items presented by the firmware setup utility 115. The firmware 110 might also present two-dimensional barcodes 125 in response to other types of inputs and at other times during the execution of the firmware 110. For example, and as discussed above, the firmware 110 might present a two-dimensional barcode 125 during a POST, after a failure of the computing system 105, and/or at other times.

From operation 202 the routine 200 proceeds to operation 205, where user input selecting a selectable item may be received. In response thereto, the routine 200 proceeds to operation 210 where, in response to detecting a selection, the firmware setup utility 115 obtains data 120 associated with the computing system 105. The data 120 associated with the computing system 105 may be gathered by various protocols related to hardware connected to the computing system 105 and accessible by the firmware setup utility 115. The received data 120 associated with the computing system 105 may be relevant to or associated with the selected item.

From operation 210, the routine 200 proceeds to operation 215 where a URL (which might also be referred to as a "hyperlink" or "link") of remotely located supporting data 150 may be obtained and/or determined. Additional details regarding operation 215 will be provided below with respect to FIG. 3.

From operation 215, the routine 200 proceeds to operation 220, where the firmware setup utility 115 determines whether the data 120 associated with the computing system 105 measures a value indicative of the health of the computing system 105. In response to determining that data 120 associated with the computing system 105 does measure a value indicative of system health, the routine 200 proceeds to operation 225. At operation 225, the firmware setup utility 115 may determine a color to be applied to the two-dimensional barcode 125 from among the colors defined in a color scheme based on the value of the data. The routine 200 then proceeds from operation 225 to operation 230. In response to determining that the data associated with the computing system 120 does not measure a value indicative of system health, the routine 200 may proceed from operation 220 to operation 230.

At operation 230, the firmware setup utility 115 generates and displays the two-dimensional barcode 125. As mentioned above, the two-dimensional barcode 125 may be a QR code or another type of two-dimensional barcode. The QR code may be generated from the data 120 associated with the computing system 105. A portion of the data 120 associated with the computing system 105 may be displayed on the interface for the firmware setup utility 115. The QR code may additionally be encoded with the URL of the remotely located supporting data 150. From operation 230, the routine 200 proceeds to operation 235, where the routine ends.

Figure 3:
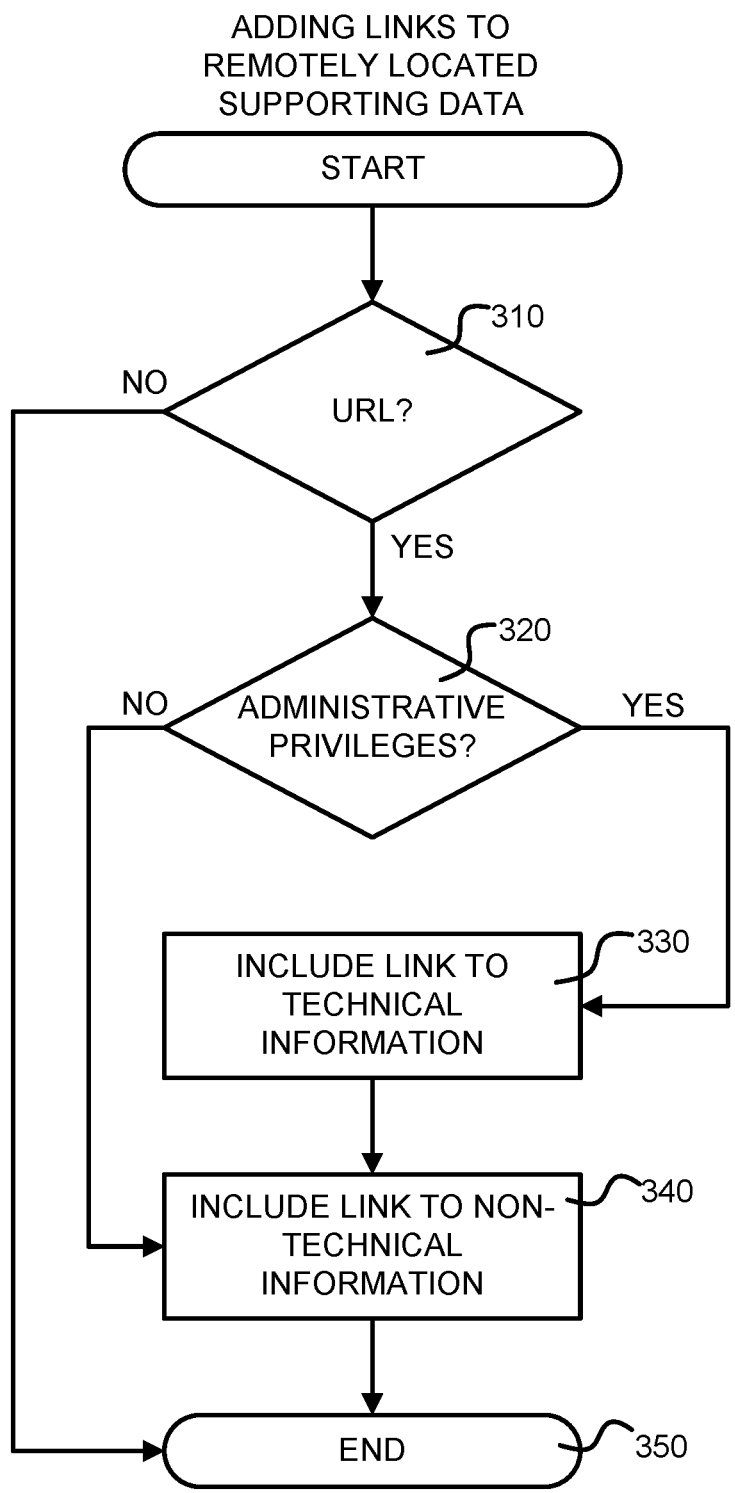
FIG. 3 is a flow diagram showing aspects of a routine disclosed herein for adding links to remotely located supporting data.

Turning now to FIG. 3, a routine 300 for adding hyperlinks to remotely located supporting data 150 will be described. The routine 300 begins at operation 310, where the firmware 110 determines whether the location of remotely located supporting data 150 should be encoded in the two-dimensional barcode 125. Examples where remotely located supporting data 150 may be desirable include, but are not limited to, messages generated by an OEM or generated in response to the detection of an error condition. Whether the location of remotely located supporting data 150 is included in the two-dimensional barcode 125 might also be determined based upon the particular selected item in the UI provided by the firmware setup utility 115. For example, some items might include an associated URL while other items do not.

At operation 320, the firmware 110 determines whether the current user of the computing system 105 has administrative privileges or user privileges. This determination may be based on the login password utilized to log into the computing system 105 or in another manner. Additionally, the privileges associated with the current user may default to user privileges when no login password has been set. If the firmware 110 determines that the current user of the computing system 105 has administrative privileges, the routine 300 proceeds to operation 330 where hyperlinks might be provided or generated that link to technical support information or other information suitable for use by an information technology professional. From operation 330, the routine 300 may proceed to operation 350, where it ends.

If the firmware 110 determines at operation 320 that the current user has user privileges (i.e. does not have administrator privileges), the routine 300 proceeds from operation 320 to operation 340, where hyperlinks are generated or obtained that link to non-technical help information suitable for use by a non-information technology professional. From operation 340, the routine 300 proceeds to operation 350 where the routine 300 ends.

It should be appreciated that although the embodiments disclosed herein have been presented in the context of user and administrator privileges, the embodiments disclosed herein are not limited to two levels of user privilege. Rather, the embodiments disclosed herein might be utilized to provide hyperlinks to different types of information based upon more than two levels of user privileges.

Figure 4:
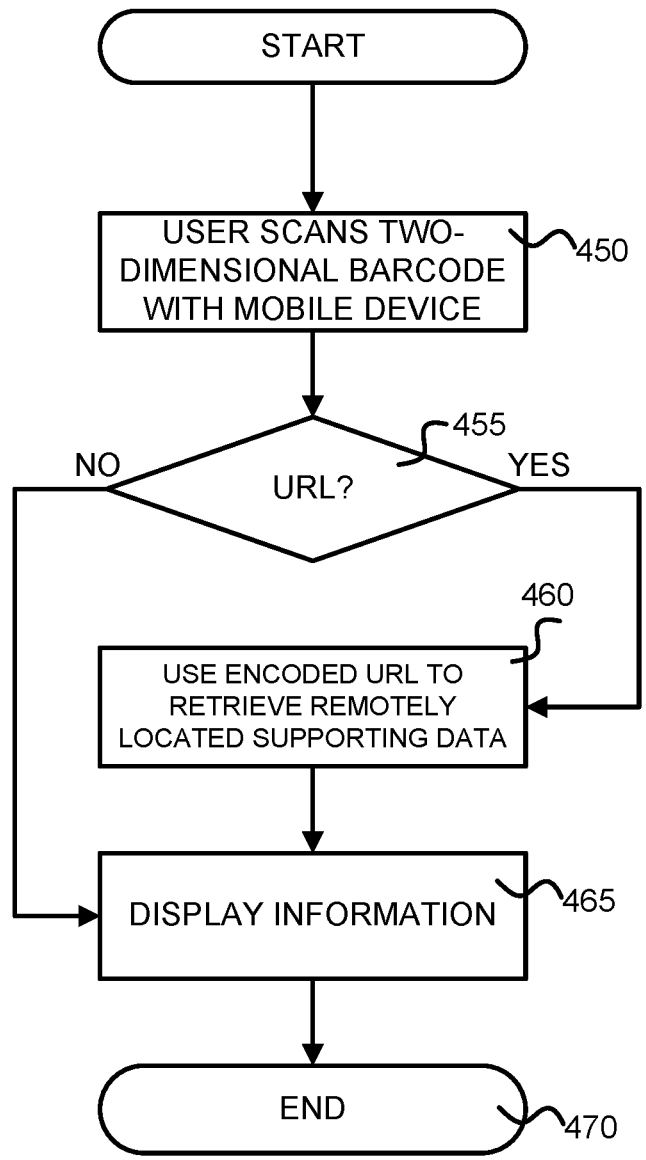
FIG. 4 is a flow diagram showing one illustrative routine for displaying data associated with a computing system and remotely located supporting data.

Referring now to FIG. 4, a routine 400 for displaying data associated with the computing system 120 and remotely located supporting data 150 will be described. The routine 400 begins at operation 450 where a user may utilize a mobile device 135 or another type of device to scan the two-dimensional barcode 125. The mobile device 135 may scan and decode the information contained in the two-dimensional barcode 125 to retrieve the data encoded therein, such as data associated with the computing system 120 and/or the URL of data 150.

From operation 450, the routine 400 proceeds to operation 455, where the mobile device 135 determines whether the data decoded from the two-dimensional barcode 125 contains a URL linking to remotely located supporting data 150. Upon determining a URL is present, the mobile device 135 may connect to the Web server 145 storing the remotely located supporting data 150 and retrieve the data 150 indicated by the URL. Upon retrieving the remotely located supporting data 150, the routine 400 may proceed from operation 460 to operation 465.

Upon the mobile device 135 determining there is no URL within the data associated with the computing system 120, the routine 400 may proceed to operation 465. At operation 465, the mobile device 135 may display the data associated with the computing system 120 and/or any accompanying remotely located supporting data 150. From operation 465, the routine 400 proceeds to operation 470 where it ends.

Figure 5:
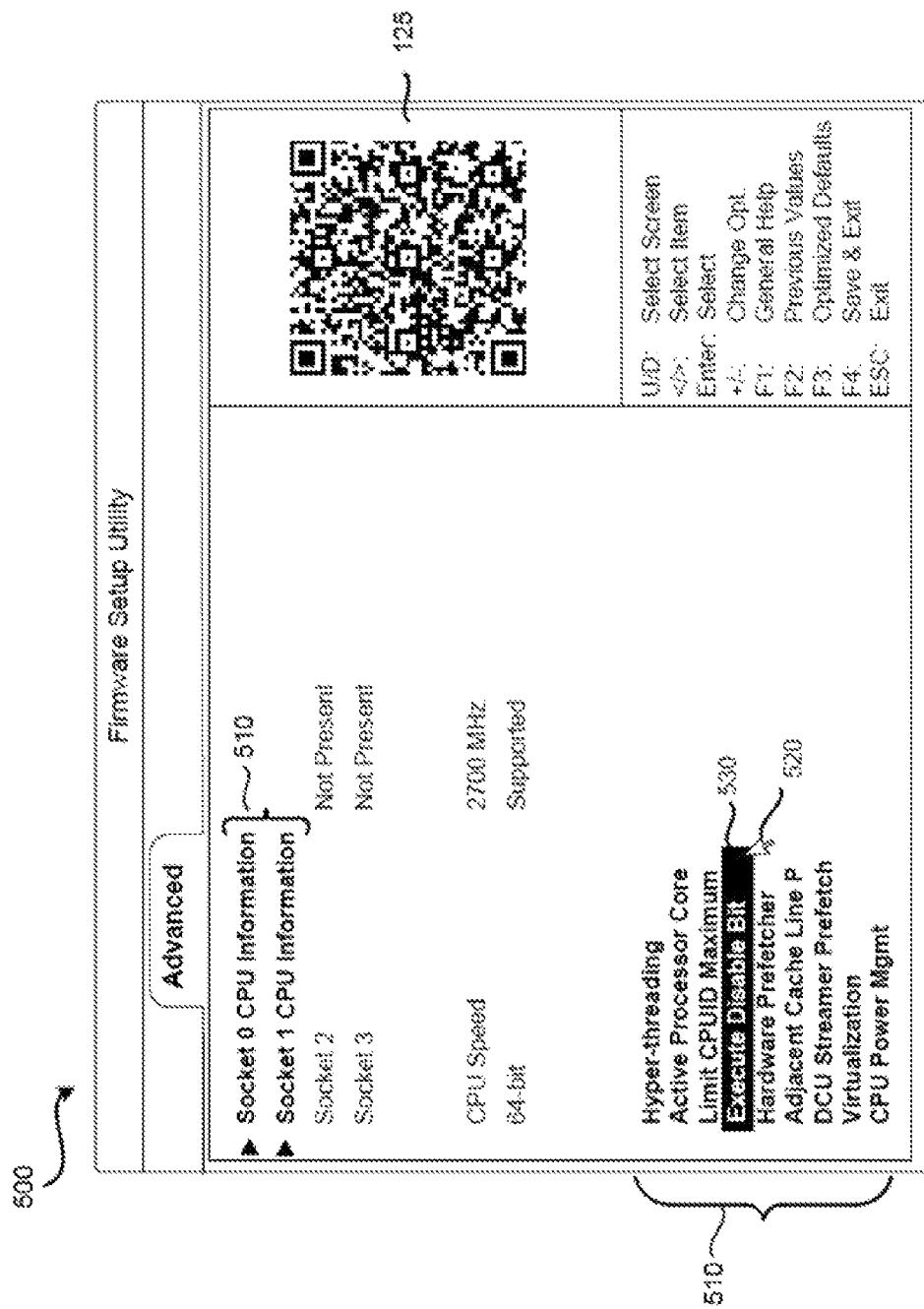
FIG. 5 is a user interface diagram showing aspects of a user interface provided by a firmware setup utility, according to an illustrative embodiment.

Referring now to FIG. 5, a UI diagram showing aspects of a user interface provided by a firmware setup utility 115, according to an illustrative embodiment will be described. A screen display 500 generated by the firmware setup utility 115 provides one or more selectable items 510. A user may select a selectable item 510 by clicking a mouse pointer 520 on the desired selectable item 510. Upon detecting the mouse click, the selected item 530 may be highlighted and a two-dimensional barcode 125, such as a QR code, that encodes data associated with the computer system 105 may be displayed. Although a click from a mouse pointer is described in reference to FIG. 5, it should be understood that any form of user input may be used to choose a selectable item 510.

Figure 6:
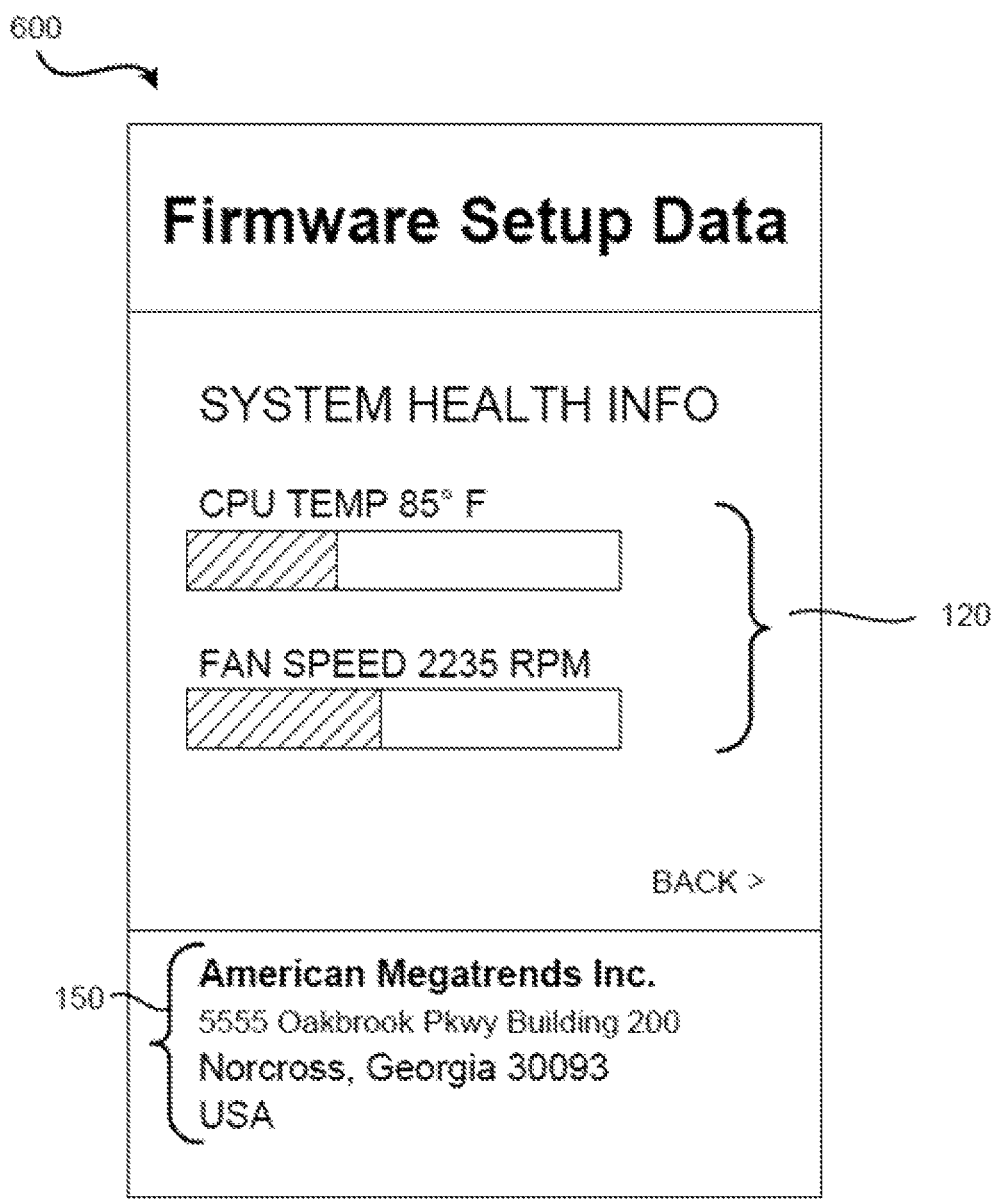
FIG. 6 is a user interface diagram showing aspects of a user interface provided on a mobile device, according to an illustrative embodiment.

Referring now to FIG. 6, a UI diagram showing aspects of a UI provided on a mobile device, according to an illustrative embodiment will be described. A mobile display 600 may present data 120 associated with the computing system 105. In the illustrative example shown in FIG. 6, data 120 showing a CPU temperature and fan speed may be displayed. In addition to the data 120 associated with the computing system 105, the mobile display 600 may present supporting data 150 retrieved from a web server 145 as indicated by a hyperlink encoded in the two-dimensional barcode 125.

Figure 7:
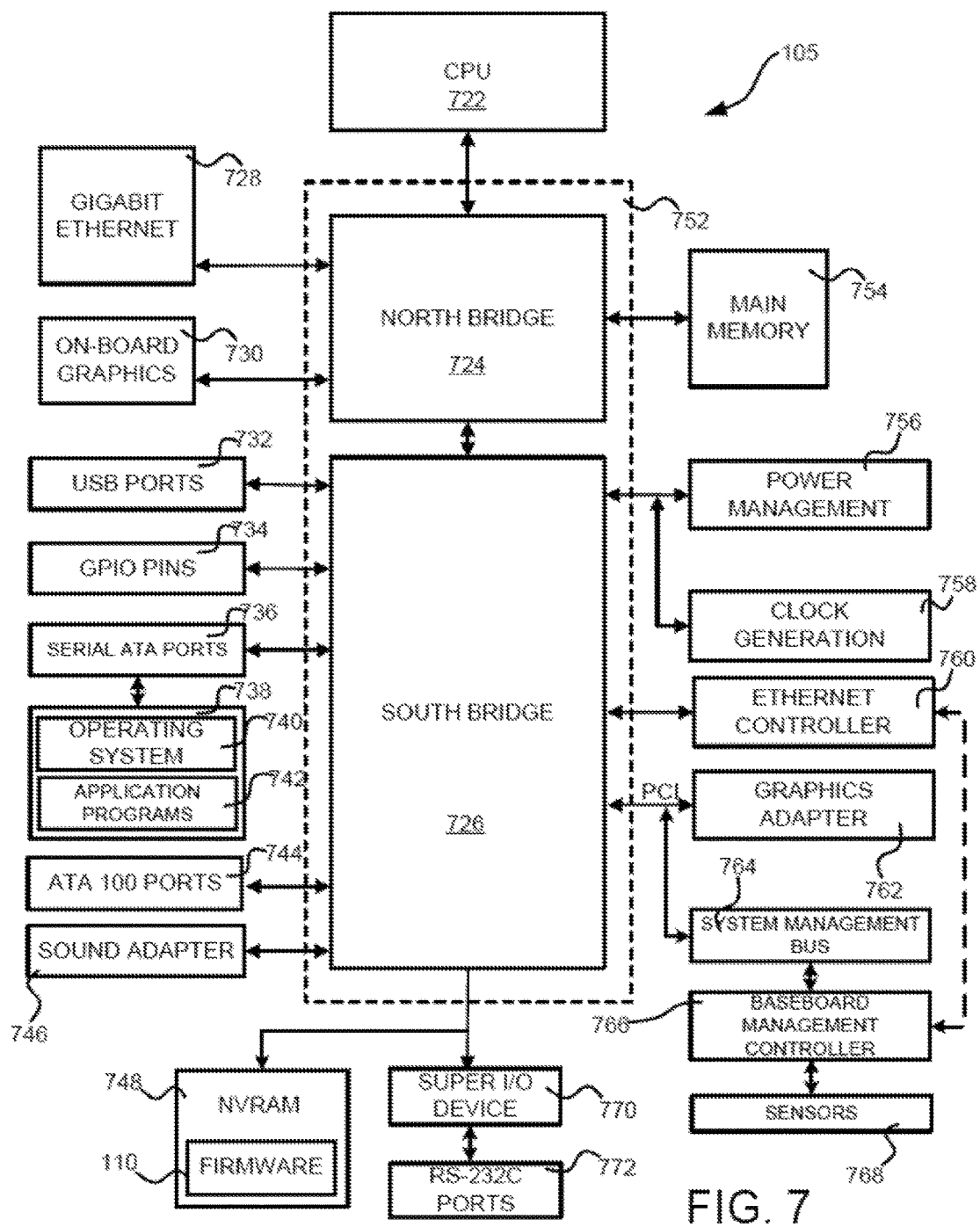
FIG. 7 is a computer architecture diagram showing an illustrative computer architecture that might be utilized to implement a computing system that embodies the various concepts and technologies presented herein.

Referring now to FIG. 7, a computer architecture diagram showing an illustrative computer architecture that might be utilized to implement a computing system that embodies the various concepts and technologies presented herein will be described. FIG. 7 and the following discussion are intended to provide a brief, general description of one suitable computing environment in which the embodiments described herein may be implemented. While the technical details are presented herein in the general context of program modules that execute in conjunction with the execution of a firmware 110, those skilled in the art will recognize that the embodiments may also be implemented in combination with other program modules.

Generally, program modules include routines, programs, components, data structures, scripts, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

As discussed briefly above, FIG. 7 shows an illustrative computer architecture that may be utilized to embody a computing system 105 capable of implementing user authentication using two-dimensional barcodes in the manner presented above. The illustrative computer architecture shown in FIG. 7 is for a computing system 105 that includes a baseboard, or "motherboard", which is a printed circuit board to which a multitude of components or devices may be connected by way of a system bus or other electrical communication path. In one illustrative embodiment, a CPU 722 operates in conjunction with a chipset 752. As discussed briefly above, the CPU 722 is a central processor that performs arithmetic and logical operations necessary for the operation of the computer. The computing system 105 may include a multitude of CPUs 722. Each CPU 722 might include multiple processing cores.

The chipset 752 includes a north bridge 724 and a south bridge 726. The north bridge 724 provides an interface between the CPU 102 and the remainder of the computing system 105. The north bridge 724 also provides an interface to a RAM 754 used as the main memory in the computing system 105 and, possibly, to an on-board graphics adapter 730.

The north bridge 724 may also include functionality for providing networking functionality through a gigabit Ethernet adapter 728. The gigabit Ethernet adapter 728 is capable of connecting the computing system 105 to another computer via a network. Connections that may be made by the network adapter 728 may include LAN or WAN connections. LAN and WAN networking environments are commonplace in offices, enterprise-wide computer networks, intranets, and the Internet. The north bridge 724 is connected to the south bridge 726.

The south bridge 726 is responsible for controlling many of the input/output functions of the computing system 105. In particular, the south bridge 726 may provide one or more universal serial bus ("USB") ports 732, a sound adapter 746, an Ethernet controller 760, and one or more general-purpose input/output ("GPIO") pins 734. The south bridge 726 may also provide a bus for interfacing peripheral card devices such as a graphics adapter 762.

The south bridge 726 is also configured to provide one or more interfaces for connecting mass storage devices to the computing system 105. For instance, according to an embodiment, the south bridge 726 includes a serial advanced technology attachment ("SATA") adapter for providing one or more serial ATA ports 736 and an ATA 100 adapter for providing one or more ATA 100 ports 744. The serial ATA ports 736 and the ATA 100 ports 744 may be, in turn, connected to one or more mass storage devices storing an operating system 740 and application programs 742, such as the SATA disk drive 738. As known to those skilled in the art, an operating system 740 comprises a set of programs that control operations of a computer and allocation of resources. An application program 742 is software that runs on top of the operating system 740 software, or other runtime environment, and uses computer resources to perform application specific tasks desired by the user.

The mass storage devices connected to the south bridge 726, and their associated computer-readable media, provide non-volatile storage for the computing system 105. Although the description of computer-readable storage media contained herein refers to a mass storage device, such as a hard disk or CD-ROM drive, it should be appreciated by those skilled in the art that computer-readable media can be any available non-transitory storage media that can be accessed by the computing system 105.

By way of example, and not limitation, computer-readable storage media includes volatile and non-volatile, removable and non-removable media implemented in any method or technology for the non-transitory storage of information such as computer-readable instructions, data structures, program modules or other data. For instance, computer-readable media includes, but is not limited to, RAM, ROM, EPROM, EEPROM, flash memory or other solid state memory technology, CD-ROM, DVD, FID-DVD, BLU-RAY, or other optical storage, magnetic cassettes, magnetic tape, magnetic disk storage or other magnetic storage devices, or any other medium which can be used to store the desired information in a non-transitory fashion, and which can be accessed by the computing system 105.

A low pin count ("LPC") interface may also be provided by the south bridge 726 for connecting a "Super I/O" device 770. The Super I/O device 770 is responsible for providing a number of input/output ports, including a keyboard port, a mouse port, a serial interface 772, a parallel port, and other types of input/output ports. The LPC interface may also connect a computer-readable media such as a ROM or a flash memory such as the NVRAM 748 for storing a firmware 110 that includes program code containing the basic routines (e.g., a BIOS) that help to start up the computing system 105 and for performing other functions.

It should be appreciated that the software components described herein may, when loaded into the CPU 722 and executed, transform the CPU 722 and the overall computing system 105 from a general-purpose computing system into a special-purpose computing system customized to facilitate the functionality presented herein. The CPU 722 may be constructed from any number of transistors or other discrete circuit elements, which may individually or collectively assume any number of states. More specifically, the CPU 722 may operate as a finite-state machine, in response to executable instructions contained within the software modules disclosed herein. These computer-executable instructions may transform the CPU 722 by specifying how the CPU 722 transitions between states, thereby transforming the transistors or other discrete hardware elements constituting the CPU 722.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computing system 105 in order to store and execute the software components presented herein. It also should be appreciated that the computing system 105 may comprise other types of computing devices, including hand-held computers, embedded computer systems, personal digital assistants, and other types of computing devices known to those skilled in the art. It is also contemplated that the computing system 105 may not include all of the components shown in FIG. 7, may include other components that are not explicitly shown in FIG. 7, or may utilize an architecture completely different than that shown in FIG. 7, (e.g., on non-x86 CPU-based platforms, an ARM processor from ARM HOLDINGS, PLC of the United Kingdom or other processors may be used).

Based on the foregoing, it should be appreciated that concepts and technologies for obtaining additional information from a computer system firmware utilizing two-dimensional barcodes have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing information in a firmware environment utilizing two-dimensional barcodes, the method comprising computer-implemented operations for:

displaying, by way of a computing system, a plurality of selectable headings in a user interface of a firmware setup utility;

determining privileges associated with a current user of the computing system;

gathering from the computing system, for individual selectable headings of the plurality of selectable headings, data associated with the computing system, the data selected, at least partly, based on the privileges associated with the current user and providing additional information associated with the individual selectable headings;

generating respective two-dimensional barcodes corresponding to each of the individual selectable headings, the two-dimensional barcodes encoding the respective corresponding gathered data;

detecting a user input selecting one of the plurality of selectable headings; and displaying, in the user interface, the two-dimensional barcode corresponding to the selected one of the plurality of selectable headings in response to detecting the user input, wherein the two-dimensional barcode corresponding to the selected one of the plurality of selectable headings is based at least in part on the privileges associated with the current user.

2. The computer-implemented method of claim 1, wherein the data associated with the computing system measures a value indicative of system health.

3. The computer-implemented method of claim 2, wherein generating a two-dimensional barcode further comprises applying a color to the two-dimensional barcode from among a plurality of colors, wherein each of the plurality of colors represents a value, or range of values, or data indicative of system health.

4. The computer-implemented method of claim 1, wherein the data associated with the computing system comprises firmware version information.

5. The method of claim 1, wherein the data associated with the computing system comprises a unique identifier for a particular hardware device in the computing system.

6. The computer-implemented method of claim 1, wherein detecting the user input selecting the one of the plurality of selectable headings further comprises detecting user input over the one of the plurality of selectable headings.

7. The computer-implemented method of claim 1, wherein determining the privileges associated with the current user comprises determining whether the current user has administrative privileges or user privileges.

8. The computer-implemented method of claim 1, wherein the two-dimensional barcode comprises a Quick Response (QR) code.

9. The computer-implemented method of claim 1, wherein the selectable headings represent configurable parameters associated with the computing system.

10. A system for providing information in a firmware environment using two-dimensional barcodes, the system comprising:

a mobile computing device; and a computing system executing a firmware configured to display a plurality of selectable headings in a user interface, each of the plurality of selectable headings representing a configurable parameter associated with the computing system, gather, for each of the plurality of selectable headings, data associated with the computing system, the data providing additional details associated with the configurable parameter, the data selected, at least partly, based on the privileges associated with a current user, generate a two-dimensional barcode for each of the plurality of selectable headings, the two-dimensional barcode encoding the gathered data, detect a user input selecting one of the plurality of selectable headings, and display the two-dimensional barcode corresponding to the selected one of the plurality of selectable headings in response to detecting the user input selecting one of the plurality of selectable headings, wherein the two-dimensional barcode corresponding to the selected one of the plurality of selectable headings is based at least in part on the privileges associated with the current user.

11. The system of claim 10, wherein the firmware is further configured to:

determine whether the current user of the computing system has administrative privileges or user privileges;

in response to determining the current user has administrative privileges, including, in the data providing additional details associated with the configurable parameter, location data specifying a source of technical information related to the configurable parameter; and in response to determining the current user has user privileges, including, in the data providing additional details associated with the configurable parameter, location data specifying a source of help information related to the configurable parameter.

12. The system of claim 10, wherein displaying the two-dimensional barcode in response to detecting the user input selecting one of the plurality of selectable headings further comprises displaying the two-dimensional barcode from a user interface of a firmware setup utility.

13. The system of claim 12, wherein displaying the two-dimensional barcode in response to detecting the user input selecting one of the plurality of selectable headings further comprises displaying the two-dimensional barcode in response to detecting a mouse-over event.

14. The system of claim 10, wherein the two-dimensional barcode is a Quick Response (QR) code.

15. The system of claim 10, wherein the data associated with the computing system comprises a Uniform Resource Locator (URL) of a source of additional information related to the data associated with the computing system.

16. The system of claim 15, wherein the additional information related to the data associated with the computing system comprises information from an original equipment manufacturer (OEM) of the computing system.

17. The system of claim 16, wherein the information from an OEM comprises links to an OEM social media site.

18. A non-transitory computer-readable medium having computer-executable instructions stored thereon which, when executed by a computing system, cause the computing system to:

display, in a firmware setup utility on the computing system, one or more selectable headings representing configurable parameters associated with the computing system, gather, for each of the one or more selectable headings, location data specifying a source of additional information associated with each of the selectable headings;

generate a two-dimensional barcode for each of the one or more selectable headings, the two-dimensional barcode encoding the gathered data, detect a user input selecting one of the one or more selectable headings, determine whether the data associated with the computing system for the selected one of the one or more selectable headings comprises an error message related to a test failure, in response to determining that the data associated with the computing system does not comprise the error message, display the two-dimensional barcode corresponding to the selected one of the one or more selectable headings in response to detecting the user input selecting one of the one or more selectable headings, and in response to determining that the data associated with the computing system comprises the error message, increase a display size of the two-dimensional barcode encoding the error message beyond a display size of the two-dimensional barcode corresponding to the selected one of the one or more selectable headings.

19. The non-transitory computer-readable storage medium of claim 18, wherein the data associated with the computing system comprises a Uniform Resource Locator (URL) of a source of additional information related to the data associated with the computing system.

20. The non-transitory computer-readable storage medium of claim 19, wherein the additional information related to the data associated with the computing system comprises information from an original equipment manufacturer (OEM) of the computing system.

* * * * *